(12) United States Patent
Huang

(10) Patent No.: US 6,671,926 B2
(45) Date of Patent: Jan. 6, 2004

(54) WHEEL MECHANISM FOR STROLLER

(75) Inventor: Pao-Shan Huang, Chia-I Hsien (TW)

(73) Assignee: Link Treasure Limited, Tortola (VG)

( * ) Notice: Subject to any disclaimer, the term of this patent is extended or adjusted under 35 U.S.C. 154(b) by 0 days.

(21) Appl. No.: 10/097,381

(22) Filed: Mar. 15, 2002

(65) Prior Publication Data
US 2002/0178541 A1 Dec. 5, 2002

(30) Foreign Application Priority Data
May 31, 2001 (TW) ........................... 90208928 U

(51) Int. Cl.⁷ .............................................. B60B 33/00
(52) U.S. Cl. ...................................... 16/35 R; 16/18 R
(58) Field of Search ............................. 16/35 R, 18 R; 280/87.01–87.051, 43, 647–650

(56) References Cited

U.S. PATENT DOCUMENTS

| | | | | |
|---|---|---|---|---|
| 1,861,919 A | * | 6/1932 | Hill .................................. 16/34 |
| 4,028,773 A | * | 6/1977 | Morgan ....................... 16/35 R |
| 4,123,819 A | * | 11/1978 | Benedetti ........................ 16/24 |
| 4,205,413 A | * | 6/1980 | Collignon et al. .......... 16/35 D |
| 4,248,445 A | * | 2/1981 | Vassar ..................... 280/79.11 |
| 4,336,629 A | * | 6/1982 | Jarvis, Jr. et al. ........... 16/35 R |
| 4,759,098 A | * | 7/1988 | Ko ................................. 16/29 |
| 4,913,452 A | * | 4/1990 | Zun ......................... 280/47.41 |
| 5,536,033 A | | 7/1996 | Hinkston |
| 5,876,309 A | | 3/1999 | Archey |
| 6,163,924 A | * | 12/2000 | Ward, Jr. et al. ........... 16/35 R |
| 6,196,572 B1 | | 3/2001 | Durrin |

FOREIGN PATENT DOCUMENTS

JP 59153602 A * 9/1984 ........... B60B/33/00

* cited by examiner

Primary Examiner—Anthony Knight
Assistant Examiner—Michael J. Kyle
(74) Attorney, Agent, or Firm—Birch, Stewart, Kolasch & Birch, LLP

(57) ABSTRACT

A wheel mechanism for controlling turning of the front wheel of a stroller includes a vertical axle and a latch mechanism. The upper end of the vertical axle is pivotally connected to the frame of the stroller. The lower end of the vertical axle is fixed to a horizontal axle of the wheel. The latch is movably mounted along the vertical axle and the frame and selectively moved between a released position and a locked position. When in the released position, the wheel can freely turn around the vertical axle. When in the locked position, the wheel cannot turn on the vertical axle but only rotates with the horizontal axle in a certain direction.

8 Claims, 7 Drawing Sheets

WHEEL MECHANISM FOR STROLLER

BACKGROUND OF THE INVENTION

1. Field of the Invention

The invention generally relates to a mechanism for a wheel, and particularly relates to a wheel control mechanism applicable to a front wheel of a baby stroller. The mechanism allows the user to select whether the wheel will be universally turning or not.

2. Related Art

A baby stroller generally includes a frame and several wheels mounted under the frame. A carrier with a soft pad is attached to the frame for a child or baby to sit in or lie on. The frame includes a handle for moving the stroller. Different kinds of strollers have been made in which the frames are foldable or fixed, the seats or beds are for one or two babies, the wheels are of common types or sporting types, and three or four wheels are used. A sporting-type stroller, for example, as that disclosed in U.S. Pat. Nos. 6,196,572, 5,876,309 or 5,536,033, is carried along by parents who go walking or jogging while the child sits in the stroller. In order to manipulate the stroller easily, the stroller is equipped with three wheels of which one is in the front and two at the back. Since the stroller is moved by a user at a higher speed when jogging, the front wheel is usually fixed in the forward direction to ensure safety of the baby or child, instead of universal rotation, which may cause unintentional turning and falling of the stroller when it moves on uneven ground.

Since strollers are rather expensive, costing 100 to 300 U.S. dollars or more, a family usually cannot afford two kinds of strollers, i.e., one for common use and one for jogging. Therefore, when using a jogging-type stroller at low speed, the single direction wheel makes the turning difficult and inconvenient.

Therefore, an ideal wheel for a stroller would be one that can be easily changed between universal rotation and single directional modes.

SUMMARY OF THE INVENTION

The object of the invention is to provide a wheel mechanism by which a wheel can be selectively changed with functions of universal turning and fixed directional turning.

A wheel mechanism according to the invention includes a vertical axle and a latch mechanism. The upper end of the vertical axle is pivotally connected to the frame of the stroller. The lower end of the vertical axle is fixed to a horizontal axle of the wheel. The latch is movably mounted along the vertical axle and the frame and selectively moved between a released position and a locked position. When in the released position, the wheel can freely turn around the vertical axle. When in the locked position, the wheel cannot turn on the vertical axle but only rotates with the horizontal axle in a certain direction.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given hereinbelow. However, this description is for purposes of illustration only, and thus is not limitative of the invention, wherein.

DETAILED DESCRIPTION OF THE INVENTION

Figure 1:
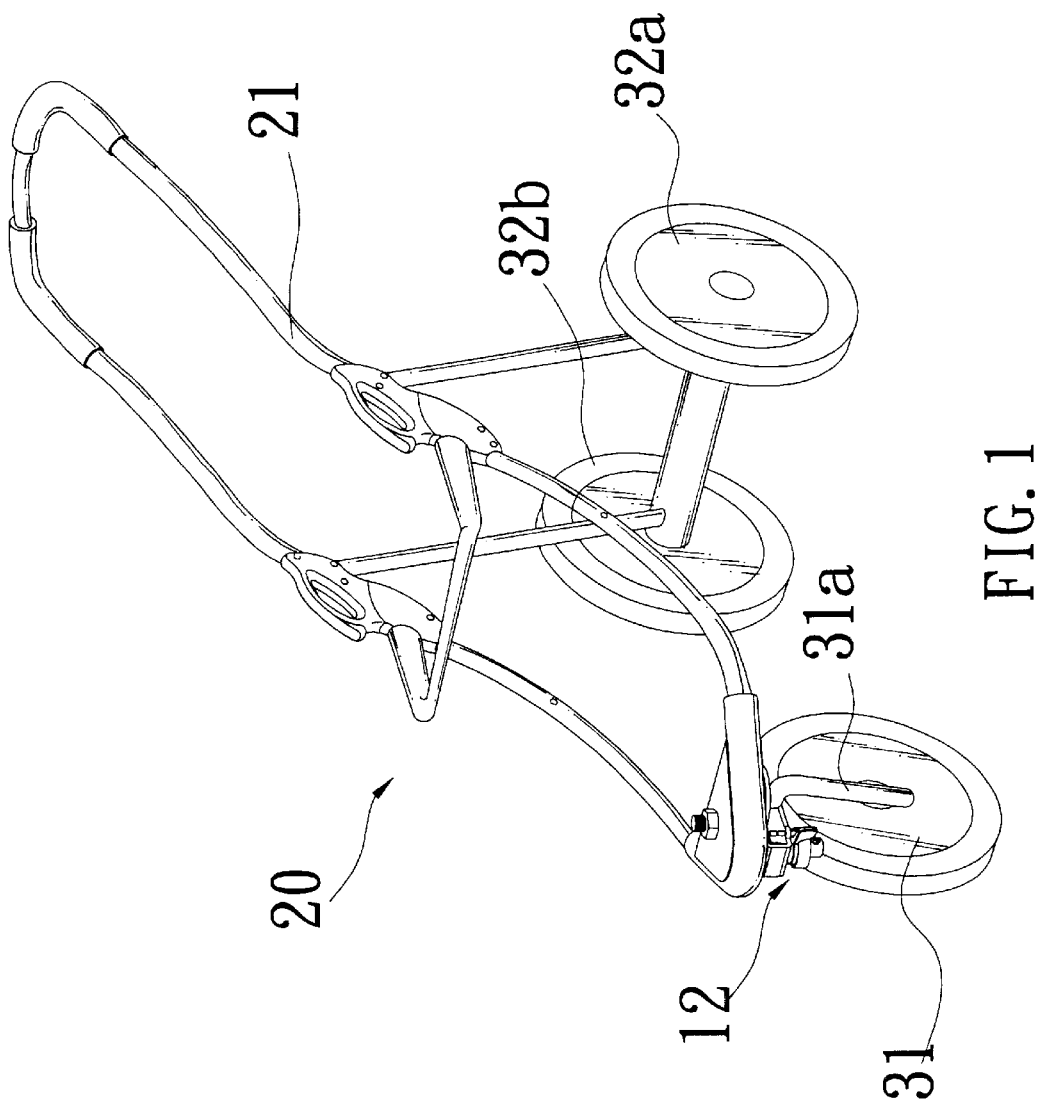
FIG. 1 is an overall view of a stroller using a wheel mechanism of the invention.
Figure 2:
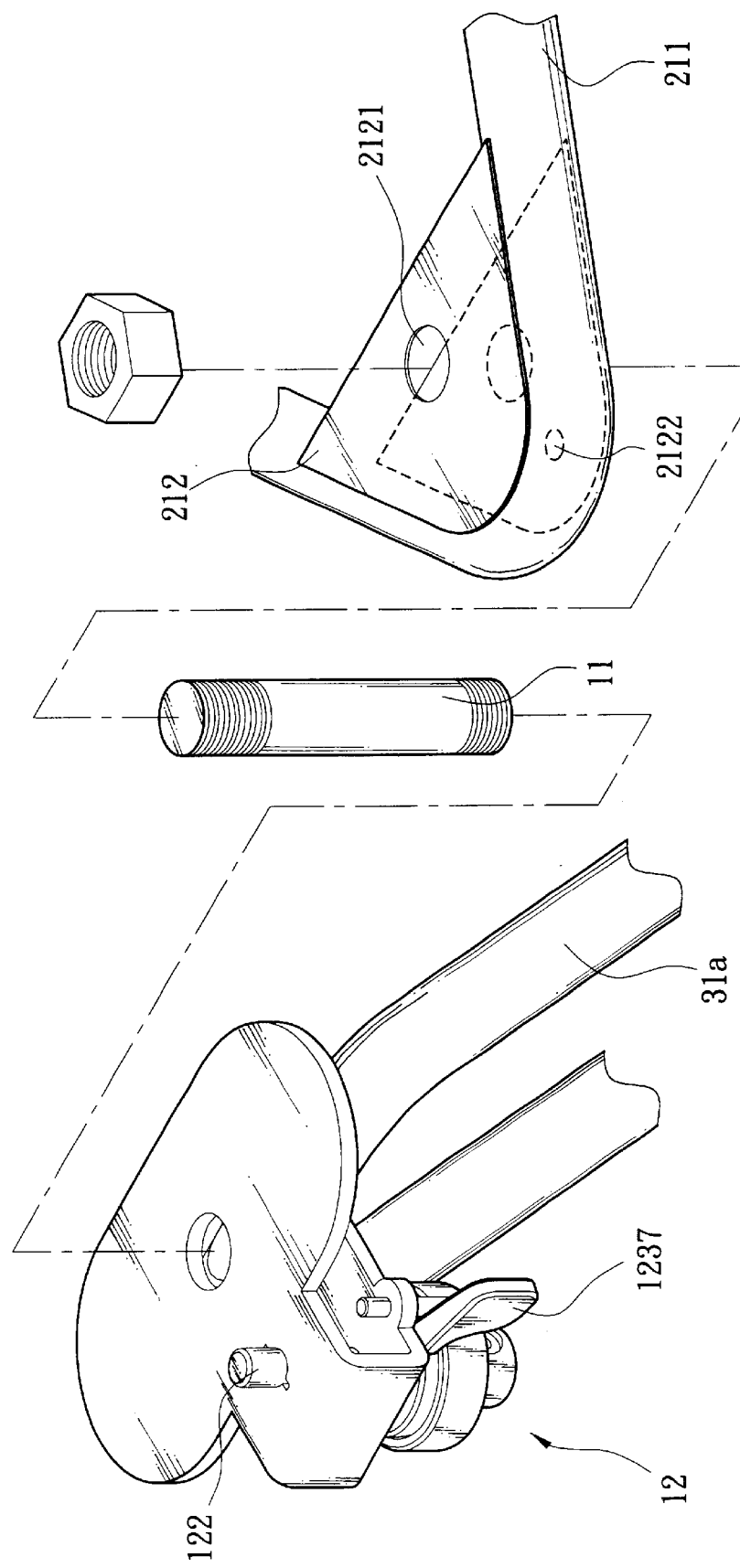
FIG. 2 is a constructional view of a wheel mechanism of the invention.

As shown in FIG. 1, a wheel mechanism of the invention is applied to a stroller 20. The stroller 20 includes a frame 21, a front wheel 31 equipped with wheel mechanism and mounted under the front portion of the frame 21, and a pair of back wheels 32a and 32b mounted under the back portion of the frame 21. The frame 21 is composed of several tubes on which a carrier covered with a soft pad (not shown) is mounted for carrying a baby or providing a seat for a child. The front wheel 31 can turn in different directions and can be fixed, which will be described later. The back wheels 32a and 32b are of a fixed-directional type. By the front and back wheels 31, 32a and 32b rotating on the ground, the stroller 20 can be moved by a user. As shown in FIG. 2, the front end 211 of the frame 21 is formed with a pivotal portion 212 having a through hole 2121 and a locking hole 2122 formed under the pivotal portion 212 and located in front of the through hole 2121.

The locking mechanism for the front wheel 32 includes a vertical axle 11 and a latch mechanism 12. The vertical axle 11 is pivotally mounted in the through hole 2121 and fastened with a nut 111 at the top end thereof so as to prevent it from separating from the hole 2121. The bottom end of the vertical axle 11 is connected with the latch mechanism 12. A frame 31a for mounting the front wheel is connected to the latch mechanism 12 so as to be an adjustable member for mounting the front wheel 31 in a selectable turning and fixed manner (unfix or fix the relative position of the vertical axle 11 and the latch mechanism 12).

Figure 3A:
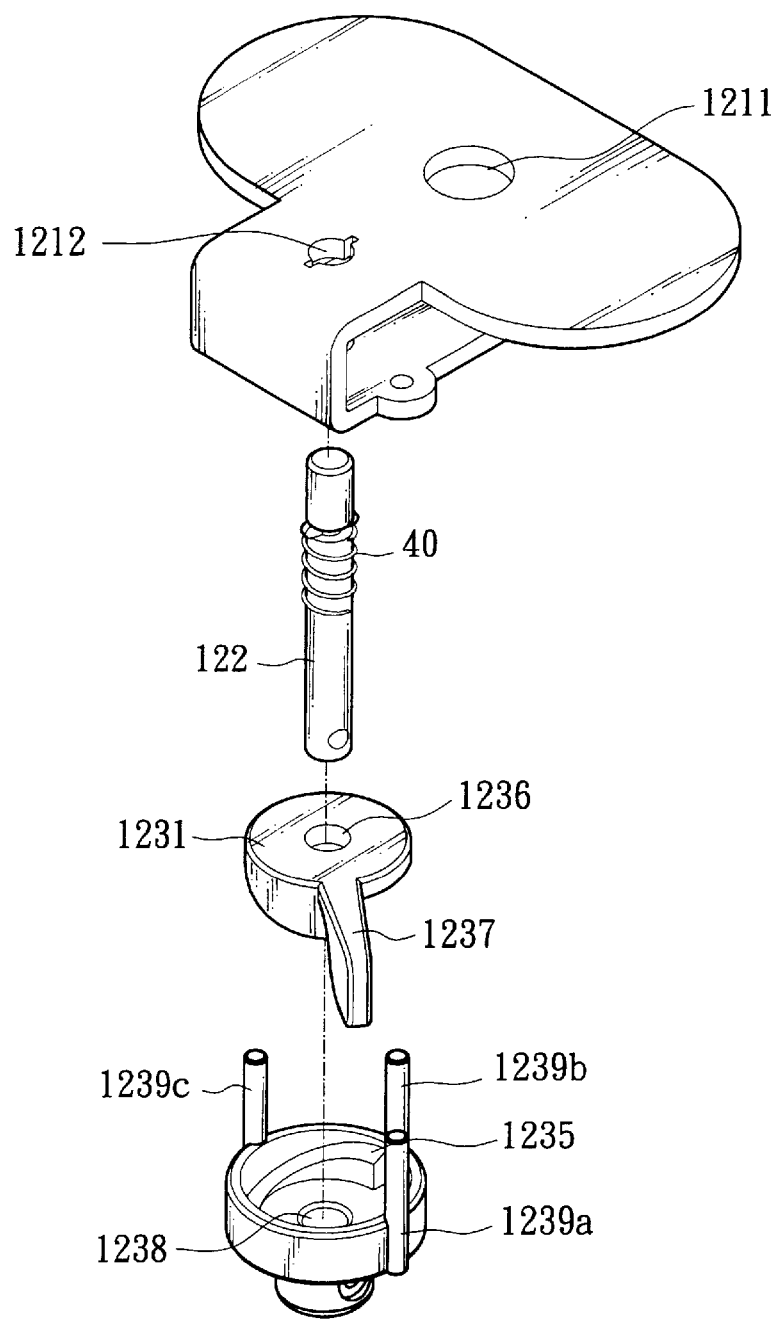
FIGS. 3A and 3B are exploded views of a latch mechanism in the wheel mechanism of the invention.
Figure 3B:
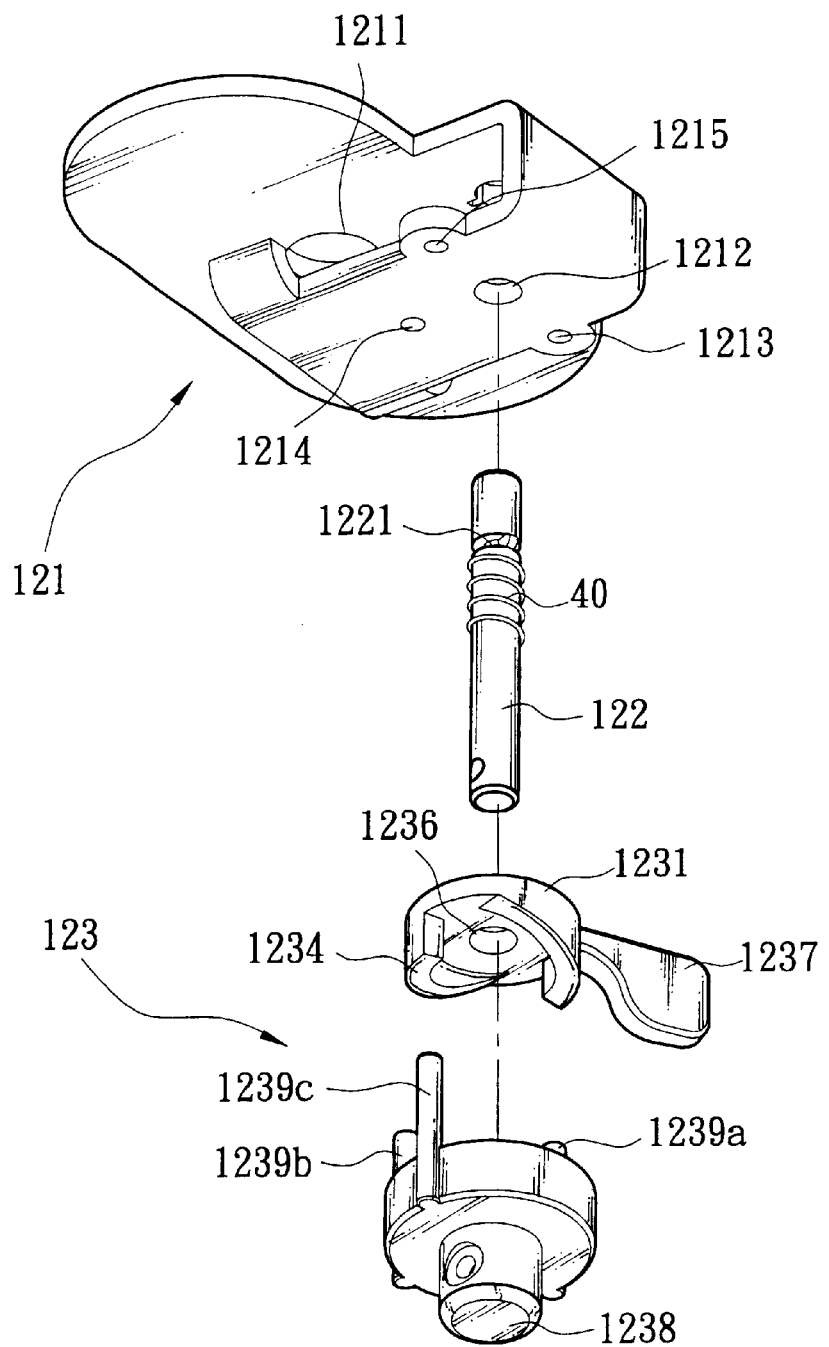

As shown in FIGS. 3A and 3B, the latch mechanism 12 is composed of a connecting member 121, a latch pin 122 and a movable device 123. The connecting member 121 is a C-shaped member for fixing the front-wheel frame 31a between the top and bottom surfaces of the connecting member. A first through hole 1211 is formed on the top of the connecting member at a position corresponding to the through hole 2121 of the pivotal portion 212 of the frame 21. There are second through holes 1212 formed on the top and bottom surfaces of the connecting member at a position corresponding to the locking hole 2122. The bottom end of the aforesaid vertical axle 11 passes through the first through hole 1211 and connects to the frame 31a so as to connect the connecting member 121 to the bottom of the vertical axle 11. Then, the front wheel 31 can turn with the vertical axle 11. On the rim of the second through hole 1212 there are third, fourth and fifth through holes 1213, 1214 and 1215, as shown in FIG. 3B.

The movable device 123 includes a pair of rotators 1231 and 1232. There are corresponding screw surfaces 1234 and 1235 formed on the two rotators 1231 and 1232 so that the rotators can change their distance upon relative rotation. The upward rotator 1231 is formed with a through hole 1236 at the center and a handle 1237 at the rim. The lower rotator 1232 is formed with a fastening portion 1238 and three guiding rods 1239*a*, 1239*b* and 1239*c* corresponding to the positions of the third, fourth and fifth through holes 1213, 1214 and 1215.

Figure 4:
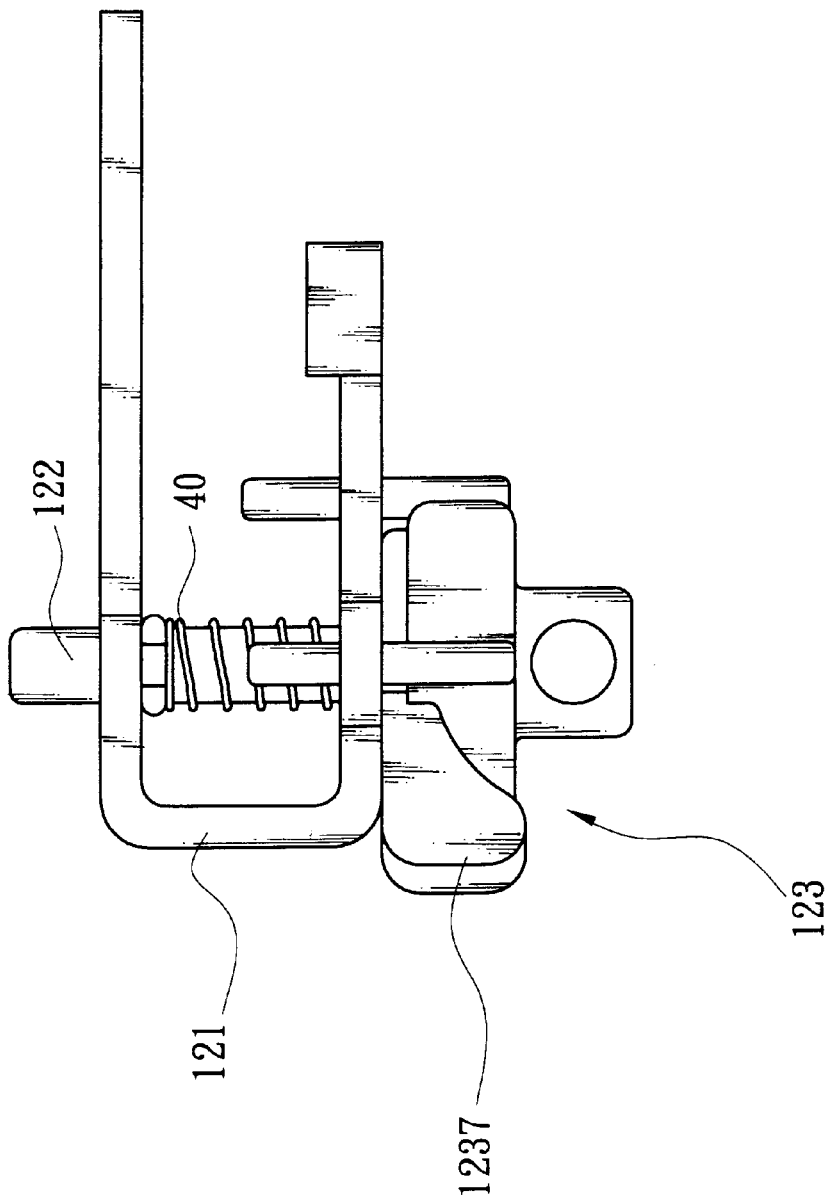
FIG. 4 is a side view of a latch mechanism in the wheel mechanism of the invention.

The bottom end of the latch pin 122 is fixed to the fastening portion 1238 of the rotator 1232. A circular groove 1221 is formed on the upper portion of the latch pin 121 for mounting thereon a resilient member 40. The latch pin 122 is fixed to the rotator 1232, passes through the rotator 1231 and the second through hole 1212 of the connecting member 121 and extrudes from the top surface of the connecting member 121. The guiding rods 1239*a*, 1239*b* and 1239*c* of the rotator 1232 also pass through the third, fourth and fifth through holes 1213, 1214 and 1215. By fastening with C-clamps (not shown in the drawings) or the like, the guiding rods connect the rotators 1231 and 1232 under the connecting member 121 and prevent them from separating. Before the latch pin 122 passes through the second through hole 1212, a resilient element 40 is mounted in the position of the second through hole 1212 of the connecting member 121. Therefore, as shown in FIG. 4, the latch pin 122 passes through the second through hole 1212 and the resilient element 40 and extrudes from the top surface of the connecting member 121. One end of the resilient element 40 is fixed in the groove 1221 of the latch pin 122 so as to push the latch pin 122 upward from the top of the connecting member 121 into a locked position. While being pressed down to counter the force of the resilient element 40, the latch pin 122 retracts into the top of the connecting member 121 into a released position.

Figure 5A:
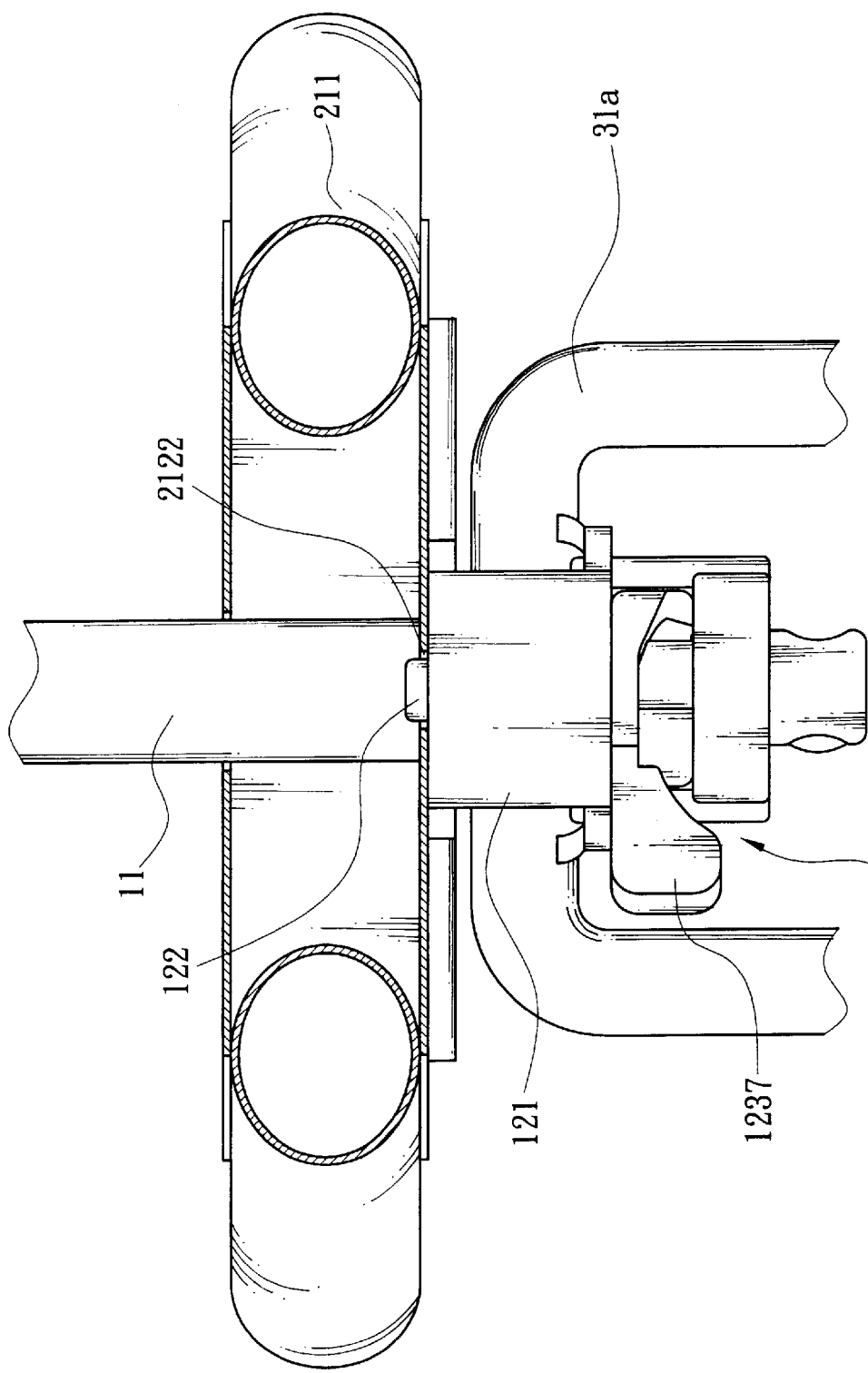
FIGS. 5A and 5B are functional views of a wheel mechanism of the invention.
Figure 5B:
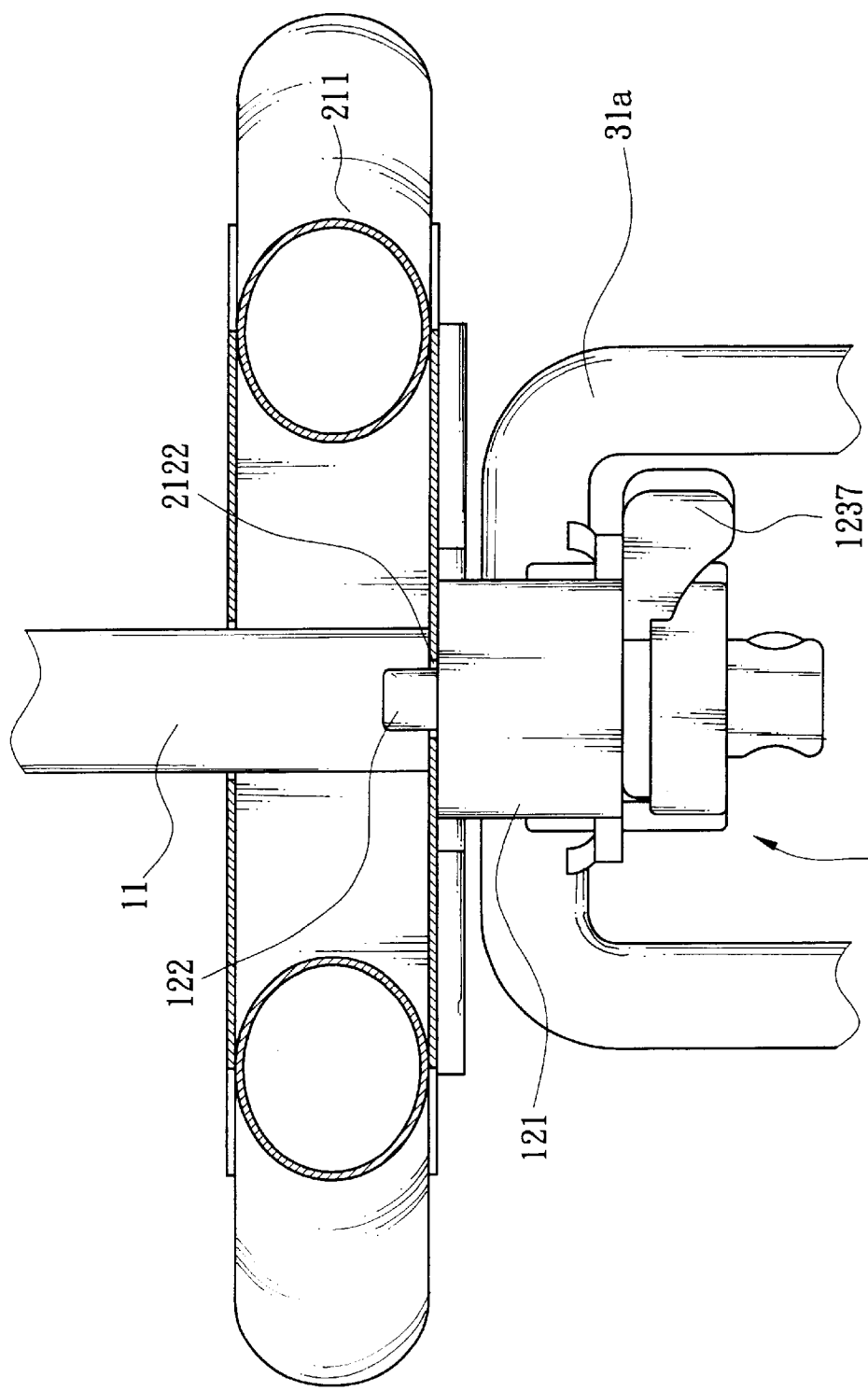

As shown in FIG. 5B, the latch pin 122 is normally in the locked position, in which the latch pin 122 extrudes over the locking hole 2122 and limits the turning of the front wheel 31 on the vertical axle 11. In this condition, the baby stroller 20 can be used as a jogging-type stroller since the front wheel will not turn, which prevents the stroller from falling down while moving fast on uneven ground. As shown in FIG. 5A, a user rotates the rotator 1231 by pushing it downward by the function of the screw surfaces 1234 and 1235. The downward movement of the rotator 1232 also moves the latch pin 122 to the release position, i.e., the latch pin 122 departs from the locking hole 2122 so that the front wheel 31 can freely turn. This is for the condition in which the baby stroller is moved at a lower speed, with the front wheel 31 being free to turn and the stroller being easily manipulated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A wheel mechanism, applicable to a front wheel mounted on a front end of a frame of a stroller, for limiting turning of said wheel, comprising:

a vertical axle, having a lower end fixed to a horizontal axle of the wheel, and an upper end pivotally connected to said front end of said frame of the stroller, for pivotally connected said wheel to said frame; and a latch mechanism, mounted among said vertical axle and said frame for selectively fixing the relative position of said vertical axle and said frame, the latch mechanism including:

a latch pin, and a movable device for controlling movement of the latch pin, the movable device including a pair of rotors, one of the rotors being connected to said latch pin and each rotor having a screw surface which faces to each other, so as to convert a relative rotation into a linear movement and control the movement of said latch pin.

2. The wheel mechanism for limiting turning of a wheel according to claim 1, wherein said front end of said frame comprises a locking hole for said latch mechanism to latch therein.

3. The wheel mechanism for limiting turning of a wheel according to claim 1, wherein said rotator has a handle for relative rotation.

4. The wheel mechanism for limiting turning of a wheel according to claim 1, further comprising a spring surrounding the latch pin.

5. The wheel mechanism for limiting turning of a wheel according to claim 4, wherein the screw surfaces are centered about the latch pin and wherein the vertical axle about which the wheel is pivotally connected is spaced from the latch pin.

6. The wheel mechanism for limiting turning of a wheel according to claim 5, wherein the latch pin is linearly reciprocates without pivoting.

7. The wheel mechanism for limiting turning of a wheel according to claim 1, wherein the screw surfaces are centered about the latch pin and wherein the vertical axle about which the wheel is pivotally connected is spaced from the latch pin.

8. The wheel mechanism for limiting turning of a wheel according to claim 1, wherein the latch pin is linearly reciprocates without pivoting.

* * * * *